US006993548B2

(12) United States Patent
Walster et al.

(10) Patent No.: US 6,993,548 B2
(45) Date of Patent: Jan. 31, 2006

(54) METHOD AND APPARATUS FOR BOUNDING THE SOLUTION SET OF A SYSTEM OF LINEAR EQUATIONS

(75) Inventors: G. William Walster, Cupertino, CA (US); Eldon R. Hansen, Los Altos, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 613 days.

(21) Appl. No.: 10/061,494

(22) Filed: Jan. 31, 2002

(65) Prior Publication Data

US 2003/0145027 A1  Jul. 31, 2003

(51) Int. Cl.
    *G06F 7/38*  (2006.01)
(52) U.S. Cl. .................................................. 708/446
(58) Field of Classification Search ........... 708/446, 708/490, 200
    See application file for complete search history.

(56) References Cited

OTHER PUBLICATIONS

Granelli et al., Relaxation-Newton methods for transient stability analysis on a vector parallel computer, 1993, IEEE, pp. 387-393.*
Hiroyuki et al., Contingency screening using interval analysis in power systems, 1998, IEEE, pp. 444-447.*
Foo et al, Stability analysis of a family of matrices, 1990, IEEE, pp. 1257-1259.*
Zian et al, Interval arithmetic in power flow analysis, 1992, IEEE, pp. 1341-1349.*

William G. W., Interval: the connection between computing and the world, 2000, IEEE, p. 859-864.*
Brian Sanderson, Gauss-Seidel, 2000, HTML at http://web.maths.unsw.edu.au/~bxs/MATH5245/fmg1/node7.html.*
Kearfott et al., Optimal preconditioners for interval Gauss-Seidel methods, 2000, HTML at http://interval.louisiana.edu/preprints/shi-scan-preconditioner.pdf, pp. 1-7.*
Pascal Van Hentenryck, Vijay Saraswat and Yves Deville, "Design, Implementation, and Evaluation of the Constraint Language cc (FD)," Elsevier Science, Inc., 1998.
E.R. Hansen, "Global Optimization Using Interval Analysis," Marcel Dekker, Inc., New York, NY, 1992.
R.B. Kearfott, "A Fortran 90 Environment for Research and Prototyping of Enclosure Algorithms for Nonlinear Equations and Global Optimization," ACM Transactions on Mathematical Software, vol. 21, No. 1, Mar. 1995, pp. 63-78 http://interval.louisiana.edu/preprints.html.
R. B. Kearfott, Algorithm 763: Interval Arithmetic: A Fortran 90 Module for an Interval Data Type, ACM Trans. Math. Software, 22, vol. 4, 1996, pp. 385-392.

(Continued)

*Primary Examiner*—Kakali Chaki
*Assistant Examiner*—Chat C. Do
(74) *Attorney, Agent, or Firm*—Park, Vaughan & Fleming LLP

(57) ABSTRACT

One embodiment of the present invention provides a system that bounds the solution set of a system of nonlinear equations specified by the set of linear equations $Ax=b$, wherein A is an interval matrix and b is an interval vector. During operation, the system preconditions the set of linear equations $Ax=b$ by multiplying through by a matrix B to produce a preconditioned set of linear equations $M_0x=r$, wherein $M_0=BA$ and $r=Bb$. Next, the system widens the matrix $M_0$ to produce a widened matrix, M, wherein the midpoints of the elements of M form the identity matrix. Finally, the system uses M and r to compute the hull h of the system $Mx=r$, which bounds the solution set of the system $M_0x=r$.

17 Claims, 4 Drawing Sheets

OTHER PUBLICATIONS

R. B. Kearfott and M. Novoa III, "Algorithm 681: INTBIS, A portable interval Newton/bisection package", ACM Trans. Math Software, vol. 16, No. 2, pp. 152-147. http://www.netlib.org/toms/681.

R. B. Kearfott, M. Dawande, K.S. Du, and C. Hu, "Algorithm 737: INTLIB: A Portable Fortran 737 Interval Standard Functiona Library," ACM Trans. Math. Software, 20, vol. 4, Dec. 1994, pp. 447-458.

R. B. Kearfott and G.W. Walster, "On Stopping Criteria in Verified Nonlinear Systems of Optimization Algorithms," ACM Trans. Math. Software, 26, vol. 3, Sep. 2000, pp. 323-351. The publication itself says Received: Jul. 1999; revised: Mar. 2000; accepted: Mar. 2000. http://interval.louisiana.edu/preprints.html.

R.E. Moore and S.T. Jones "Safe Starting Regions for Iterative Methods", SIAM Journal on Numerical Analysis, vol. 14, No. 6 (Dec. 1977), pp. 1051-1065.

A. Neumaier, "The Enclosure of Solutions of Parameter-Dependent Systems of Euqations," Cambridge University Press, Cambridge, 1990, ISBN: 0-12-505630-3, Reliability in Computing pp. 269-286.

S.M. Rump, "Verification Methods for Dense and Sparse Systems of Equations," in Topics in Validated Computations: Proceedings of the IMACS-GAMM International Workshop on Validated Computations, University of Oldenburg, J. Herzberger, ed., Elsevier Studies in Computational Mathematics, Elsevier, 1994, pp. 63-136.

* cited by examiner $$X \equiv [\underline{x}, \bar{x}] \equiv \{x \in \Re^* | \underline{x} \leq x \leq \bar{x}\}$$

$$Y \equiv [\underline{y}, \bar{y}] \equiv \{y \in \Re^* | \underline{y} \leq y \leq \bar{y}\}$$

(1) $X + Y = [\downarrow \underline{x} + \underline{y}, \uparrow \bar{x} + \bar{y}]$ (2) $X - Y = [\downarrow \underline{x} - \bar{y}, \uparrow \bar{x} - \underline{y}]$ (3) $X \times Y = [\min(\downarrow \underline{x} \times \underline{y}, \underline{x} \times \bar{y}, \bar{x} \times \underline{y}, \bar{x} \times \bar{y}), \max(\uparrow \underline{x} \times \underline{y}, \underline{x} \times \bar{y}, \bar{x} \times \underline{y}, \bar{x} \times \bar{y})]$ (4) $X/Y = [\min(\downarrow \underline{x}/\underline{y}, \underline{x}/\bar{y}, \bar{x}/\underline{y}, \bar{x}/\bar{y}), \max(\uparrow \underline{x}/\underline{y}, \underline{x}/\bar{y}, \bar{x}/\underline{y}, \bar{x}/\bar{y})]$, if $0 \notin Y$ $X/Y \subseteq \Re^*$, if $0 \in Y$

FIG. 5

METHOD AND APPARATUS FOR BOUNDING THE SOLUTION SET OF A SYSTEM OF LINEAR EQUATIONS

BACKGROUND

1. Field of the Invention

The present invention relates to performing arithmetic operations on interval operands within a computer system. More specifically, the present invention relates to a method and an apparatus that uses interval arithmetic to bound the solution set of a system of linear equations.

2. Related Art

Rapid advances in computing technology make it possible to perform trillions of computational operations each second. This tremendous computational speed makes it practical to perform computationally intensive tasks as diverse as predicting the weather and optimizing the design of an aircraft engine. Such computational tasks are typically performed using machine-representable floating-point numbers to approximate values of real numbers. (For example, see the Institute of Electrical and Electronics Engineers (IEEE) standard 754 for binary floating-point numbers.)

In spite of their limitations, floating-point numbers are generally used to perform most computational tasks.

One limitation is that machine-representable floating-point numbers have a fixed-size word length, which limits their accuracy. Note that a floating-point number is typically encoded using a 32, 64 or 128-bit binary number, which means that there are only $2^{32}$, $2^{64}$ or $2^{128}$ possible symbols that can be used to specify a floating-point number. Hence, most real number values can only be approximated with a corresponding floating-point number. This creates estimation errors that can be magnified through even a few computations, thereby adversely affecting the accuracy of a computation.

A related limitation is that floating-point numbers contain no information about their accuracy. Most measured data values include some amount of error that arises from the measurement process itself. This error can often be quantified as an accuracy parameter, which can subsequently be used to determine the accuracy of a computation. However, floating-point numbers are not designed to keep track of accuracy information, whether from input data measurement errors or machine rounding errors. Hence, it is not possible to determine the accuracy of a computation by merely examining the floating-point number that results from the computation.

Interval arithmetic has been developed to solve the above-described problems. Interval arithmetic represents numbers as intervals specified by a first (left) endpoint and a second (right) endpoint. For example, the interval [a, b], where a<b, is a closed, bounded subset of the real numbers, R, which includes a and b as well as all real numbers between a and b. Arithmetic operations on interval operands (interval arithmetic) are defined so that interval results always contain the entire set of possible values. The result is a mathematical system for rigorously bounding numerical errors from all sources, including measurement data errors, machine rounding errors and their interactions. (Note that the first endpoint normally contains the "infimum", which is the largest number that is less than or equal to each of a given set of real numbers. Similarly, the second endpoint normally contains the "supremum", which is the smallest number that is greater than or equal to each of the given set of real numbers.)

One commonly performed computational operation is to find the solution of a system of interval linear equations. What is needed is a method and an apparatus that uses interval arithmetic to efficiently compute narrow bounds on the solution set of a system of linear equations.

SUMMARY

One embodiment of the present invention provides a system that bounds the solution set of a system of linear equations Ax=b, wherein A is an interval matrix and b is an interval vector. During operation, the system preconditions the set of linear equations Ax=b by multiplying through by a matrix B to produce a preconditioned set of linear equations $M_0 x = r$, wherein $M_0 = BA$ and r=Bb. Next, the system widens the matrix $M_0$ to produce a widened matrix M, wherein the midpoints of the elements of M form the identity matrix. Finally, the system uses M and r to compute the hull h of the system Mx=r, which bounds the solution set of the system $M_0 x = r$.

In a variation on this embodiment, the system computes the matrix B by computing an approximate center $A_C$ of the matrix A, and then forming B by computing the approximate inverse of $A_C$, $B = (A_C)^{-1}$.

In a variation on this embodiment, the system additionally assures that $\sup(r_i) \geq 0$ by changing the sign of $r_i$ and $x_i$ if necessary.

In a variation on this embodiment, the system uses M and r to compute the hull h by forming P as an inverse of the left endpoint of M. The system also forms $c_i = 1/(2P_{ii} - 1)$ for i=1, ..., n and forms $z_i = (\inf(r_i) + \sup(r_i))P_{ii} - e_i^T P\sup(r)$, wherein $e_i^T$ is a unit vector in which the i-th element is 1 and other elements are 0. The system then forms h by: setting $\inf(h_j) = c_i z_i$ if $z_i > 0$; setting $\inf(h_i) = z_i$ if $z_i \leq 0$; and setting $\sup(h) = P\sup(r)$.

In a variation on this embodiment, the system determines whether or not M is regular. If the inverse of inf(M) exists and is denoted by P, and if $\inf(M_{ii}) > 0$ for all i, then M, $M_0$ and A are all regular if and only if $P \geq I$. If not, the system terminates the process of computing the hull h.

BRIEF DESCRIPTION OF THE FIGURES

FIG. 5 illustrates four different interval operations in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs).

Computer System

Figure 1:
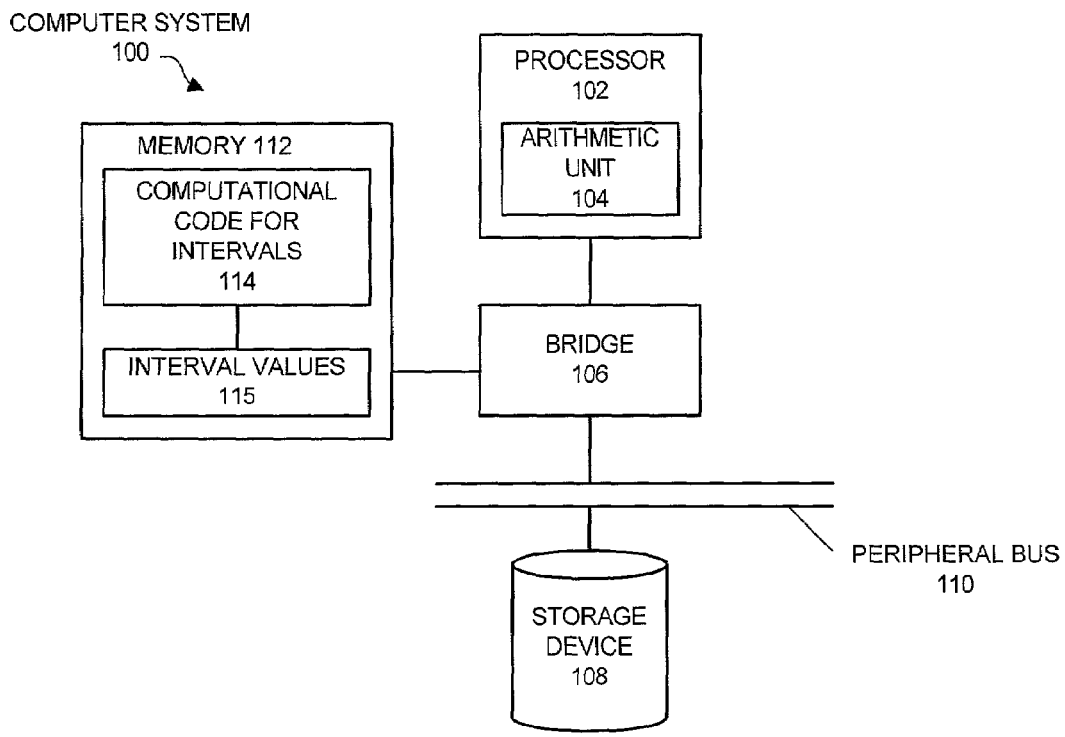
FIG. 1 illustrates a computer system in accordance with an embodiment of the present invention.

FIG. 1 illustrates a computer system 100 in accordance with an embodiment of the present invention. As illustrated in FIG. 1, computer system 100 includes processor 102, which is coupled to a memory 112 and a to peripheral bus 110 through bridge 106. Bridge 106 can generally include any type of circuitry for coupling components of computer system 100 together.

Processor 102 can include any type of processor, including, but not limited to, a microprocessor, a mainframe computer, a digital signal processor, a personal organizer, a device controller and a computational engine within an appliance. Processor 102 includes an arithmetic unit 104, which is capable of performing computational operations using floating-point numbers.

Processor 102 communicates with storage device 108 through bridge 106 and peripheral bus 110. Storage device 108 can include any type of non-volatile storage device that can be coupled to a computer system. This includes, but is not limited to, magnetic, optical, and magneto-optical storage devices, as well as storage devices based on flash memory and/or battery-backed up memory.

Processor 102 communicates with memory 112 through bridge 106. Memory 112 can include any type of memory that can store code and data for execution by processor 102. As illustrated in FIG. 1, memory 112 contains computational code for intervals 114. Computational code 114 contains instructions for the interval operations to be performed on individual operands, or interval values 115, which are also stored within memory 112. This computational code 114 and these interval values 115 are described in more detail below with reference to FIGS. 2–5.

Note that although the present invention is described in the context of computer system 100 illustrated in FIG. 1, the present invention can generally operate on any type of computing device that can perform computations involving floating-point numbers. Hence, the present invention is not limited to the computer system 100 illustrated in FIG. 1.

Compiling and Using Interval Code

Figure 2:
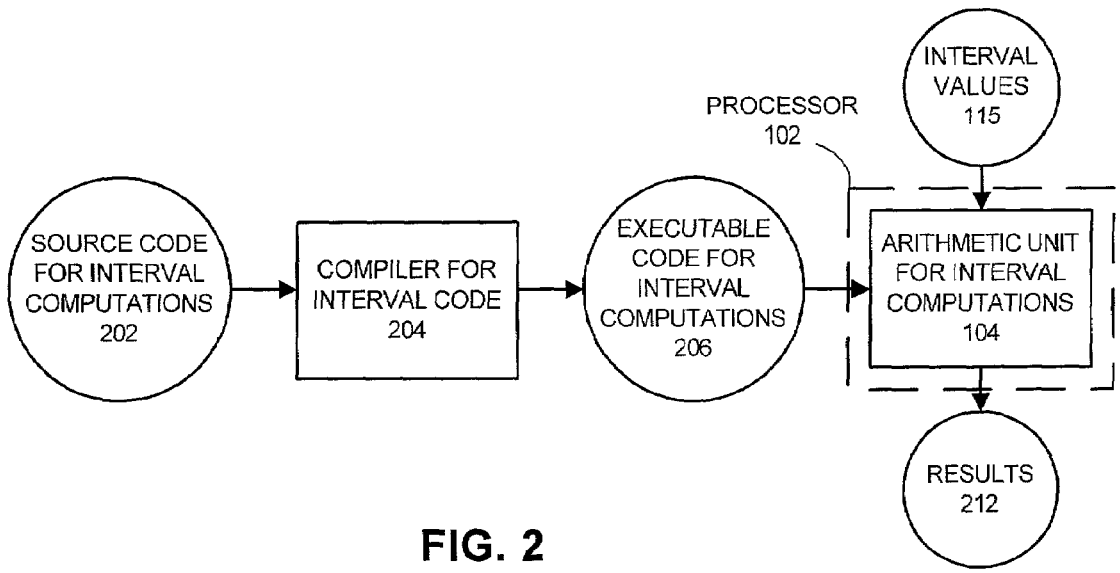
FIG. 2 illustrates the process of compiling and using code for interval computations in accordance with an embodiment of the present invention.

FIG. 2 illustrates the process of compiling and using code for interval computations in accordance with an embodiment of the present invention. The system starts with source code 202, which specifies a number of computational operations involving intervals. Source code 202 passes through compiler 204, which converts source code 202 into executable code form 206 for interval computations. Processor 102 retrieves executable code 206 and uses it to control the operation of arithmetic unit 104.

Processor 102 also retrieves interval values 115 from memory 112 and passes these interval values 115 through arithmetic unit 104 to produce results 212. Results 212 can also include interval values.

Note that the term "compilation" as used in this specification is to be construed broadly to include pre-compilation and just-in-time compilation, as well as use of an interpreter that interprets instructions at run-time. Hence, the term "compiler" as used in the specification and the claims refers to pre-compilers, just-in-time compilers and interpreters.

Arithmetic Unit for Intervals

Figure 3:
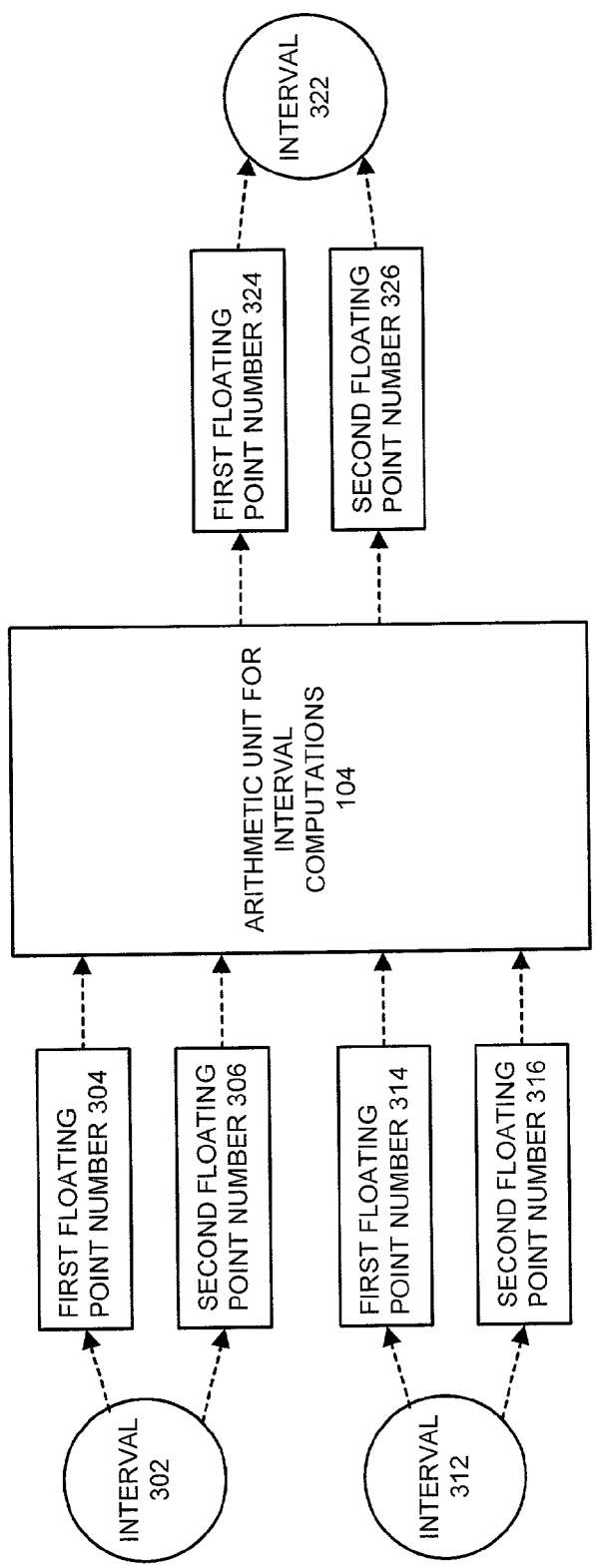
FIG. 3 illustrates an arithmetic unit for interval computations in accordance with an embodiment of the present invention.

FIG. 3 illustrates arithmetic unit 104 for interval computations in more detail accordance with an embodiment of the present invention. Details regarding the construction of such an arithmetic unit are well known in the art. For example, see U.S. Pat. Nos. 5,687,106 and 6,044,454, which are hereby incorporated by reference in order to provide details on the construction of such an arithmetic unit. Arithmetic unit 104 receives intervals 302 and 312 as inputs and produces interval 322 as an output.

In the embodiment illustrated in FIG. 3, interval 302 includes a first floating-point number 304 representing a first endpoint of interval 302, and a second floating-point number 306 representing a second endpoint of interval 302. Similarly, interval 312 includes a first floating-point number 314 representing a first endpoint of interval 312, and a second floating-point number 316 representing a second endpoint of interval 312. Also, the resulting interval 322 includes a first floating-point number 324 representing a first endpoint of interval 322, and a second floating-point number 326 representing a second endpoint of interval 322.

Note that arithmetic unit 104 includes circuitry for performing the interval operations that are outlined in FIG. 5. This circuitry enables the interval operations to be performed efficiently.

However, note that the present invention can also be applied to computing devices that do not include special-purpose hardware for performing interval operations. In such computing devices, compiler 204 converts interval operations into a executable code that can be executed using standard computational hardware that is not specially designed for interval operations.

Figure 4:
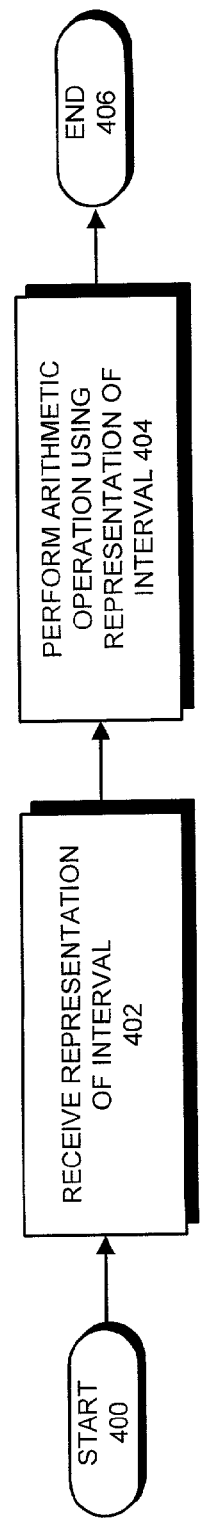
FIG. 4 is a flow chart illustrating the process of performing an interval computation in accordance with an embodiment of the present invention.

FIG. 4 is a flow chart illustrating the process of performing an interval computation in accordance with an embodiment of the present invention. The system starts by receiving a representation of an interval, such as first floating-point number 304 and second floating-point number 306 (step 402). Next, the system performs an arithmetic operation using the representation of the interval to produce a result (step 404). The possibilities for this arithmetic operation are described in more detail below with reference to FIG. 5.

Interval Operations

FIG. 5 illustrates four different interval operations in accordance with an embodiment of the present invention. These interval operations operate on the intervals X and Y. The interval X includes two endpoints, $\underline{x}$ denotes the lower bound of X, and $\overline{x}$ denotes the upper bound of X.

The interval X is a closed subset of the extended (including $-\infty$ and $+\infty$) real numbers R* (see line 1 of FIG. 5). Similarly the interval Y also has two endpoints and is a closed subset of the extended real numbers R* (see line 2 of FIG. 5).

Note that an interval is a point or degenerate interval if X=[x, x]. Also note that the left endpoint of an interior interval is always less than or equal to the right endpoint. The set of extended real numbers, R* is the set of real numbers, R, extended with the two ideal points negative infinity and positive infinity:

$$R^* = R \cup \{-\infty\} \cup \{+\infty\}.$$

In the equations that appear in FIG. 5, the up arrows and down arrows indicate the direction of rounding in the next and subsequent operations. Directed rounding (up or down) is applied if the result of a floating-point operation is not machine-representable.

The addition operation X+Y adds the left endpoint of X to the left endpoint of Y and rounds down to the nearest floating-point number to produce a resulting left endpoint, and adds the right endpoint of X to the right endpoint of Y and rounds up to the nearest floating-point number to produce a resulting right endpoint.

Similarly, the subtraction operation X−Y subtracts the right endpoint of Y from the left endpoint of X and rounds down to produce a resulting left endpoint, and subtracts the left endpoint of Y from the right endpoint of X and rounds up to produce a resulting right endpoint.

The multiplication operation selects the minimum value of four different terms (rounded down) to produce the resulting left endpoint. These terms are: the left endpoint of X multiplied by the left endpoint of Y; the left endpoint of X multiplied by the right endpoint of Y; the right endpoint of X multiplied by the left endpoint of Y; and the right endpoint of X multiplied by the right endpoint of Y. This multiplication operation additionally selects the maximum of the same four terms (rounded up) to produce the resulting right endpoint.

Similarly, the division operation selects the minimum of four different terms (rounded down) to produce the resulting left endpoint. These terms are: the left endpoint of X divided by the left endpoint of Y; the left endpoint of X divided by the right endpoint of Y; the right endpoint of X divided by the left endpoint of Y; and the right endpoint of X divided by the right endpoint of Y. This division operation additionally selects the maximum of the same four terms (rounded up) to produce the resulting right endpoint. For the special case where the interval Y includes zero, X/Y is an exterior interval that is nevertheless contained in the interval R*.

Note that the result of any of these interval operations is the empty interval if either of the intervals, X or Y, are the empty interval. Also note, that in one embodiment of the present invention, extended interval operations never cause undefined outcomes, which are referred to as "exceptions" in the IEEE 754 standard.

Bounding the Solution Set of a System of Linear Equations

Figure 6:
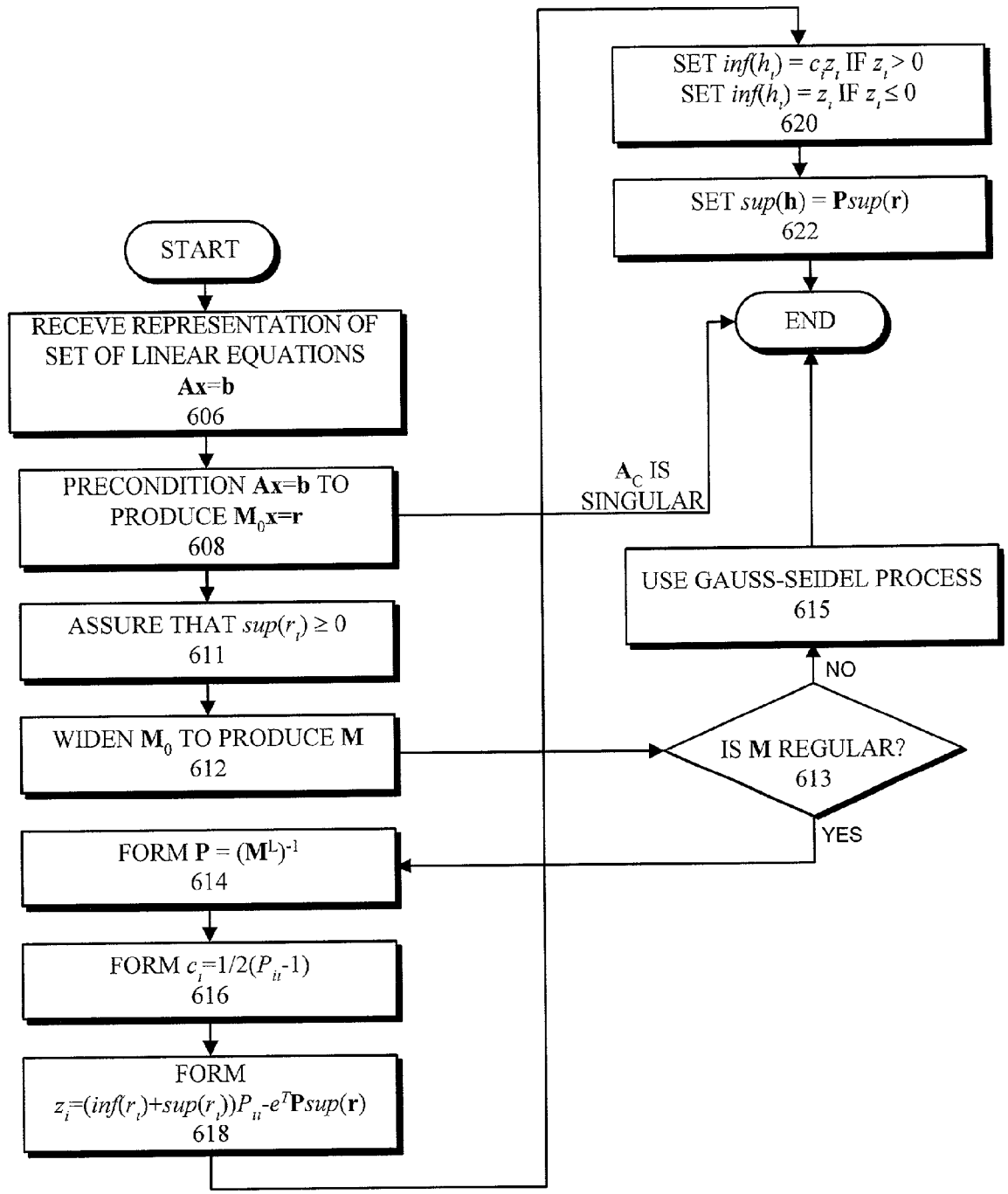
FIG. 6 illustrates the process of bounding the solution set of a system of linear equations in accordance with an embodiment of the present invention.

FIG. 6 illustrates the process of bounding the solution set of a system of linear equations in accordance with an embodiment of the present invention. The system starts by receiving a representation of the system of linear equations Ax=b, wherein A is an interval matrix and b is an interval vector (step 606).

The system then preconditions Ax=b to produce $M_0 x=r$, where $M_0=BA$ and $r=Bb$ (step 608). The preconditioning matrix B can be formed by first computing an approximate center $A_C$ of the matrix A, and then forming B, the approximate inverse of $A_C$, $B=(A_C)^{-1}$. Note that we can write $A=A_C+Q[-1,1]$ where Q is a real matrix. Therefore, the preconditioned matrix is $M=BA=I+BQ[-1,1]$. That is, the center of M is the identity matrix. If $A_C$ and B were computed exactly, the center of $M_0$ would be the identity matrix I. (Note that the system widens $M_0$ at step 612 below so that the center of the result, M, equals I.)

If we denote $M=[\inf(M),\sup(M)]$ and $r=[\inf(r), \sup(r)]$, then for $i,j=1, \ldots, n$, $\inf(M_{ij})=-\sup(M_{ij})$ ($i \neq j$), and $\inf(M_{ii})+\sup(M_{ii})=2$.

In the preceding discussion, we have ignored the fact that B does not exist if $A_C$ is singular. Suppose we try to invert $A_C$ using Gaussian elimination. If $A_C$ is singular, this fails because a pivot element is zero. At this point, the system terminates. Otherwise, if $A_C$ is not singular and B can be computed, the system continues.

Next, the system assures that $\sup(r_i) \geq 0$ by changing the sign of $r_i$ and $x_i$ if necessary (step 611). Suppose we multiply the i-th equation of the system by −1 and simultaneously change the sign of $x_i$. As noted above $\inf(M_{ij})=-\sup(M_{ij})$ for $i \neq j$. Hence, the off-diagonal elements are unchanged. Moreover, the diagonal elements change sign twice so they have no net change. Thus, the coefficient matrix is unchanged while $x_i$ and $r_i$ change sign.

We can assure that $\sup(r_i) \geq 0$ by changing the sign of $r_i$ and $x_i$ if necessary. Assume this is the case. If $0 \in r_i$, we can change the sign of $r_i$ and $x_i$ if necessary and obtain $-\inf(r_i) \leq \sup(r_i)$. Therefore, we can always assure that $0 \leq |\inf(r_i)| \leq \sup(r_i)$. Hereafter, we assume that the above relationship is satisfied for all $i=1, \ldots, n$. This simplifies the procedure for finding the hull of $M_0 x=r$.

Next, the system widens $M_0$ so that the center of the result, M, equals I (step 612). At this point, the system determines if M is regular (step 613).

If so, the system forms the hull h from M and r. In doing so, the system computes $P=(M^L)^{-1}$ as the inverse of the left endpoint $M^L$ of M (step 614). The system then forms $c_i=1/(2P_{ii}-1)$ for $i=1, \ldots, n$ (step 616), and also forms $z_i=(\inf(r_i)+\sup(r_i))P_{ii}-e_i^T P\sup(r)$ for $i=1, \ldots, n$, wherein $e_i^T$ is a unit vector in which the i-th element is 1 and other elements are 0 (step 618). Next, the system forms h by setting $\inf(h_i)=c_i z_i$ if $z_i>0$ for $i=1, \ldots, n$, and by setting $\inf(h_i)=z_i$ for $i=1, \ldots, n$ if $z_i \leq 0$ (step 620). The system also sets $\sup(h)=P\sup(r)$ (step 622).

If M was not regular at step 613, the system uses the Gauss-Seidel process to compute the hull h (step 615) before terminating.

The above-described procedure for finding the hull is valid only if M is regular. The following theorem enables us to verify regularity as a by-product of the computation of the hull.

Theorem 1: Assume $\inf(M)$ is nonsingular so that $P=(\inf(M))^{-1}$ exists. Also assume that $\inf(M_{ii})>0$ for all $i=1, \ldots, n$. Then M is regular if and only if $P \geq I$.

If, using Theorem 1, we find that M is regular, we can compute the hull h using the above-described procedure. Note, however, that the hull of the preconditioned system Mx=r is generally larger than that of the original system Ax=b.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for bounding the solution set of a system of linear equations Ax=b, wherein A is an interval matrix and b is an interval vector, the method comprising:
   receiving the system of linear equations Ax=b;
   storing Ax=b in a memory in a computer system;
   preconditioning the set of linear equations Ax=b by multiplying both side of the linear equations by a matrix B to produce a preconditioned set of linear equations BAx=Bb, wherein the set of linear equations is a representation of a global optimization problem;

substituting $M_0$=BA and r=Bb to produce $M_0$x=r;

widening the matrix $M_0$ to produce a widened matrix M, wherein the midpoints of the interval elements of M form the identity matrix; and using M and r to compute a hull h of the system Mx=r, which bounds the solution set of the system $M_0$x=r;

wherein the interval operations involved in bounding the solution set are performed using a special-purpose interval arithmetic unit configured to perform interval arithmetic operations.

2. The method of claim 1, wherein the method further comprises computing the matrix B by:

computing an approximate center $A_C$ of the interval elements of matrix A; and forming B by computing an approximate inverse of $A_C$, B=$(A_C)^{-1}$.

3. The method of claim 1, further comprising assuring that sup($r_i$)$\geq$0 by changing the sign of $r_i$ and $x_i$ if necessary, wherein $r_i$ is an element of r.

4. The method of claim 1, further comprising:

determining if M is regular; and using the Gauss-Seidel process for computing the hull h if M is not regular.

5. A computer-readable storage medium storing instructions that when executed by a computer cause the computer to perform a method for bounding the solution set of a system of linear equations Ax=b, wherein A is an interval matrix and b is an interval vector, the method comprising:

receiving the system of linear equations Ax=b;

storing Ax=b in a memory in a computer system;

preconditioning the set of linear equations Ax=b by multiplying both side of the linear equations by a matrix B to produce a preconditioned set of linear equations BAx=Bb, wherein the set of linear equations is a representation of a global optimization problem;

substituting $M_0$=BA and r=Bb to produce $M_0$x=r;

widening the matrix $M_0$ to produce a widened matrix M, wherein the midpoints of the interval elements of M form the identity matrix; and using M and r to compute a hull h of the system Mx=r, which bounds the solution set of the system $M_0$x=r;

wherein the interval operations involved in bounding the solution set are performed using a special-purpose interval arithmetic unit configured to perform interval arithmetic operations.

6. The computer-readable storage medium of claim 5, wherein the method further comprises computing the matrix B by:

computing an approximate center $A_C$ of the interval elements of matrix A; and forming B by computing an approximate inverse of $A_C$, B=$(A_C)^{-1}$.

7. The computer-readable storage medium of claim 5, wherein using M and r to compute the hull h involves:

forming P as an inverse of the left endpoint of M;

forming $c_i$=1/(2$P_{ii}$−1) for i=1, . . . , n;

forming $z_i$=(inf($r_i$)+sup($r_i$))$P_{ii}$−$e_i^T$Psup(r), wherein $e_i^T$ is a unit vector in which the i-th element is 1 and other elements are 0, and wherein $r_i$ is an element of r;

setting inf($h_i$)=$c_i z_i$ if $z_i$>0;

setting inf($h_i$)=$z_i$ if $z_i\leq$0; and setting sup(h)=Psup(r).

8. The computer-readable storage medium of claim 5, wherein the method further comprises assuring that sup($r_i$)$\geq$0 by changing the sign of $r_i$ and $x_i$ if necessary, wherein $r_i$ is an element of r.

9. The computer-readable storage medium of claim 5, wherein the method further comprises:

determining if M is regular; and using the Gauss-Seidel process for computing the hull h if M is not regular.

10. An apparatus that bounds the solution set of a system of linear equations Ax=b, wherein A is an interval matrix and b is an interval vector, comprising:

a receiving mechanism configured to receive the system of linear equations Ax=b;

a special purpose arithmetic unit configured to perform interval computations;

a storing mechanism configured to store Ax=b in a memory in a computer system;

a preconditioning mechanism within the special purpose arithmetic unit that is configured to precondition the set of linear equations Ax=b by multiplying both side of the linear equations by a matrix B to produce a preconditioned set of linear equations BAx=Bb, wherein the set of linear equations is a representation of a global optimization problem;

a substituting mechanism within the special purpose arithmetic unit that is configured to substitute $M_0$=BA and r=Rb to produce $M_0$x=r;

a widening mechanism within the special purpose arithmetic unit that is configured to widen the matrix $M_0$ to produce a widened matrix M, wherein the midpoints of the interval elements of M form the identity matrix; and a hull computing mechanism within the special purpose arithmetic unit that is configured to use M and r to compute a hull h of the system Mx=r, which bounds the solution set of the system $M_0$x=r;

wherein the interval operations involved in bounding the solution set are performed using the special-purpose interval arithmetic unit.

11. The apparatus of claim 10, wherein the preconditioning mechanism is configured to:

compute an approximate center $A_C$ of the interval elements of matrix A; and to form B by computing an approximate inverse of $A_C$, B=$(A_C)^{-1}$.

12. The apparatus of claim 10, wherein the hull computing mechanism is configured to:

form P as an inverse of the left endpoint of M;

form $c_i$=1/(2$P_{ii}$−1) for i=1, . . . , n;

form $z_i$=(inf($r_i$)+sup($r_i$))$P_{ii}$−$e_i^T$Psup(r), wherein $e_i^T$ is a unit vector in which the i-th element is 1 and other elements are 0, and wherein $r_i$ is an element of r;

set inf($h_i$)=$c_i z_i$ if $z_i$>0;

set inf($h_i$)=$z_i$ if $z_i\leq$0; and to set sup(h)=Psup(r).

13. The apparatus of claim 10, wherein the preconditioning mechanism is configured to assure that sup($r_i$)$\geq$0 by changing the sign of $r_i$ and $x_i$ if necessary, wherein $r_i$ is an element of r.

14. The apparatus of claim 10, wherein the preconditioning mechanism is configured to:

determine if M is regular; and to terminate the process of computing the hull h if M is not regular.

15. A method for bounding the solution set of a system of linear equations Ax=b by multiplying both side of the linear equations by the matrix B to produce a preconditioned set of linear equations $BAx=Bb$, wherein the set of linear equations is a representation of a global optimization problem, the method comprising:
  receiving the system of linear equations $Ax=b$;
  storing $Ax=b$ in a memory in a computer system;
  substituting $M_0=BA$ and $r=Bb$ producing $M_0 x=r$;
  assuring that $\sup(r_i) \geq 0$ by changing the sign of $r_i$ (and $x_i$) if necessary;
  widening the matrix $M_0$ to produce a widened matrix M, wherein the midpoints of the interval elements of M form the identity matrix; and
  using M and r to compute a hull h of the system $Mx=r$, which bounds the solution set of the system $M_0 x=r$ by,
    forming P as an inverse of the left endpoint of M,
    forming $c_i=1/(2P_{ii}-1)$ for $i=1, \ldots, n$,
    forming $z_i=(\inf(r_i)+\sup(r_i))P_{ii}-e_i^T P\sup(r)$, wherein $e_i^T$ is a unit vector in which the i-th element is 1 and other elements are 0, and wherein $r_i$ is an element of r,
    setting $\inf(h_i)=c_i z_i$ if $z_i>0$,
    setting $\inf(h_i)=z_i$ if $z_i \leq 0$, and
    setting $\sup(h)=P\sup(r)$;
  wherein the interval operations involved in bounding the solution set are performed using a special-purpose interval arithmetic unit configured to perform interval arithmetic operations.

16. The method of claim 15, further comprising:
  determining if M is regular; and
  using the Gauss-Seidel process for computing the hull h if M is not regular.

17. The method of claim 15, wherein the method further comprises computing the matrix B by:
  computing an approximate center $A_C$ of the interval elements of matrix A; and
  forming B by computing an approximate inverse of $A_C$, $B=(A_C)^{-1}$.

* * * * *

UNITED STATES PATENT AND TRADEMARK OFFICE
CERTIFICATE OF CORRECTION

PATENT NO. : 6,993,548 B2
DATED : January 31, 2006
INVENTOR(S) : G. William Walster et al.

It is certified that error appears in the above-identified patent and that said Letters Patent is hereby corrected as shown below:

<u>Column 8,</u>
Line 28, delete, "r=Rb" and replace with -- r=Bb --.

Signed and Sealed this

Eleventh Day of April, 2006

JON W. DUDAS
*Director of the United States Patent and Trademark Office*